June 30, 1936.                G. C. BURD                2,045,568
                      TUBULAR STRANDED WIRE STRUCTURE
                            Filed Dec. 2, 1933
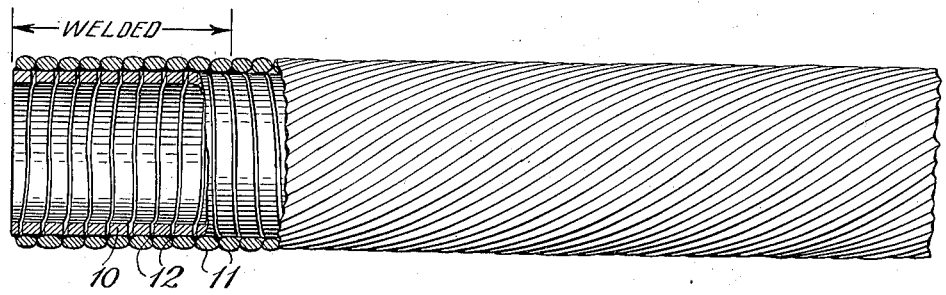
INVENTOR
GORMAN C. BURD
BY
ATTORNEY Patented June 30, 1936

2,045,568

UNITED STATES PATENT OFFICE 2,045,568

TUBULAR STRANDED WIRE STRUCTURE

Gorman C. Burd, Adrian, Mich., assignor to American Cable Company, Inc., New York, N. Y., a corporation of Delaware Application December 2, 1933, Serial No. 700,663

6 Claims. (Cl. 64—3)

The present application is a continuation in part of my copending application Serial No. 653,279, filed January 24, 1933.

My invention relates to stranded wire structures of the type used as casings for flexible shafts and Bowden wires.

An object of the invention is to provide a casing of very simple but efficient construction and one which can be manufactured at a low cost.

Another object of the invention is to provide a casing of coiled spring wire in which the usual ferrules or seizing at the ends may be dispensed with.

Another object of the invention is to provide a casing composed of a plurality of layers of spirally wound spring wire, the outer layer consisting of a plurality of wires helically formed with a relatively long pitch which will hold its position without a sheathing or binding. An advantage of this structure is that it may be made in a continuous tube and be cut off into lengths as desired without danger of springing open or fraying at the cut ends. Another advantage of this form of casing is that it may be composed of but two helical layers with the outer layer tightly gripping the inner layer, the structure being maintained by helically preforming the wire of the outer layer against any tendency to spring open.

Another object of the invention is to form a tube of the character described above with the layers welded together throughout a terminal zone so that this welded zone takes the place of the ferrule which has heretofore been considered necessary in structures of this type.

With these and other objects in view which will appear hereinafter I shall now describe a preferred embodiment of my invention and thereafter the novelty and scope of the invention will be pointed out in the claims.

The accompanying drawing represents a side view of a piece of my improved tubing with one end broken away and partly in section to reveal the inner layer of wire and to illustrate the welding of one layer to the other.

In the drawing the inner layer is indicated by the reference numeral 10 and the outer layer by the reference numeral 11. The outer layer is composed of a plurality of spring wires contiguously disposed and helically formed with a comparatively long pitch angle. These wires are preformed so as to hold a fixed position. The inner layer is reversely wound with respect to the outer layer and is composed of a single spring wire helically wound with a short pitch, but the convolutions are not contiguous, being spaced sufficiently to permit convergence of the convolutions on one side and divergence on the other when the structure is bent. The wire of the inner layer is preferably flat or of rectangular cross-section as clearly illustrated in the drawing.

The preferred method of manufacturing the tubular structure is as follows: The inner coil is first formed on a spring winding machine and the spring is then passed through a stranding machine of a standard type such as that shown in Patent No. 1,891,343, issued December 20, 1932. By passing the strand wires through helically grooved quills in the forming flange (part 21 of said patent) or by passing the strand wires about rollers between said flange and the forming die (part 50 of said patent), said wires are helically bent sufficiently to give them a permanent set such that they will fit singly side by side on the inner coil and at the same time will be free from internal stresses urging them to spring outwardly.

The structure thus formed may be severed at any point and the cut ends will not spring apart owing to the preforming of the wire composing the outer layer. The cut ends are then preferably welded together as indicated at 12. This welded portion may extend through a considerable zone as indicated in the drawing, thus permanently attaching the two layers to each other and dispensing with the necessity of using a binding or ferrule for the end of the tube.

It has been thoroughly established by continued commercial use over a considerable period of time that this tubular casing will maintain its configuration while bending, showing no tendency for the outer layer to spread away from the inner layer. This is due to the fact that the outer layer is made up of a number of preformed helices which fit snugly upon the inner helix. When the casing is bent, because the long pitched helices are contiguously disposed and resiliently supported by the inner layer, there is no spreading of the convolutions at the outside of the bend, but, instead, such relative movement of the wires as does take place consists in slight relative sliding of the wires lengthwise or in helical direction. There is no lengthening of the center line of the structure, and, the inner layer, because it consists of an open helix, accommodates itself to the bending of the casing by convergence of the convolutions thereof at the inner side of the bend and divergence at the outer side.

Having thus described my invention what I claim as new and desire to secure by Letters Patent is as follows:

1. A tubular wire casing comprising a plurality of layers of helically coiled spring wire, the outer layer of which grips the next adjacent layer and consists of contiguous convolutions free from internal stresses urging said convolutions to spring outwardly.

2. A tubular wire casing comprising a plurality of layers of helically coiled spring wire, the outer layer of which grips the next adjacent layer and consists of contiguous convolutions free from internal stresses urging said convolutions to spring outwardly, the layers being welded together throughout a terminal portion of the casing.

3. A tubular stranded wire structure comprising a plurality of layers of helically coiled spring wire, the outer layer of which grips the next adjacent layer and consists of a plurality of wires contiguously coiled with a relatively long pitch and free from internal stresses urging them to spring away from said next inner layer.

4. A tubular stranded wire structure comprising a plurality of layers of helically coiled spring wire, the outer layer of which grips the next adjacent layer and consists of a plurality of wires contiguously coiled with a relatively long pitch and free from internal stresses urging them to spring away from said next inner layer, the helix angle of the coils of said outer layer being reversed with respect to that of said next inner layer.

5. A tubular stranded structure comprising an inner layer of helically coiled spring wire and an outer layer also of helically coiled spring wire gripping the inner layer, the inner layer being composed of a single helix of short pitch and mutually spaced convolutions and the outer layer of a plurality of contiguously disposed helices of long pitch reversely angled with respect to the lay of the inner helix, the wires of the outer layer being free from internal stresses urging them to spring outwardly.

6. A tubular stranded structure comprising an inner layer of helically coiled spring wire and an outer layer also of helically coiled spring wire gripping the inner layer, the inner layer being composed of a single helix of short pitch and mutually spaced convolutions and the outer layer of a plurality of contiguously disposed helices of long pitch reversely angled with respect to the lay of the inner helix, the wires of the outer layer being free from internal stresses urging them to spring outwardly, the inner and outer layers being welded together throughout a terminal zone of the structure.

GORMAN C. BURD.